(12) United States Patent
Lee (10) Patent No.: US 10,592,081 B2
(45) Date of Patent: Mar. 17, 2020

(54) MULTI-LANGUAGE INPUT METHOD AND MULTI-LANGUAGE INPUT APPARATUS USING THE SAME

(71) Applicant: Samsung Electronics Co., Ltd., Gyeonggi-do (KR)

(72) Inventor: Gyoung Ryoul Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 349 days.

(21) Appl. No.: 14/509,714

(22) Filed: Oct. 8, 2014

(65) Prior Publication Data

US 2015/0128082 A1 May 7, 2015

(30) Foreign Application Priority Data

Nov. 1, 2013 (KR) ........................ 10-2013-0132092

(51) Int. Cl.
*G06F 3/0484* (2013.01)
*G06F 3/0488* (2013.01)

(52) U.S. Cl.
CPC ...... *G06F 3/04847* (2013.01); *G06F 3/04842* (2013.01); *G06F 3/04886* (2013.01)

(58) Field of Classification Search
None
See application file for complete search history.

(56) References Cited

U.S. PATENT DOCUMENTS

| 5,832,113 | A | 11/1998 | Sano | |
|---|---|---|---|---|
| 8,232,973 | B2 * | 7/2012 | Kocienda | G06F 3/0237 345/168 |
| 8,255,836 | B1 * | 8/2012 | Gildfind | G06F 3/04812 345/173 |
| 8,286,104 | B1 | 10/2012 | Yonge-Mallo | |
| 8,782,550 | B1 * | 7/2014 | Patridge | G06F 3/0488 715/702 |
| 8,904,309 | B1 * | 12/2014 | Zhai | G06F 3/0237 715/773 |
| 2006/0127872 | A1 * | 6/2006 | Marggraff | G06F 3/03545 434/353 |
| 2006/0236022 | A1 * | 10/2006 | Van Epps, Jr. | G06F 1/1613 711/100 |
| 2008/0122796 | A1 * | 5/2008 | Jobs | G06F 3/0488 345/173 |
| 2009/0174667 | A1 * | 7/2009 | Kocienda | G06F 3/0237 345/169 |

(Continued)

FOREIGN PATENT DOCUMENTS

| EP | 0 661 619 | 7/1995 |
|---|---|---|
| KR | 100784260 | 12/2007 |

(Continued)

OTHER PUBLICATIONS

Youtube, "Viet Fast Keyboard", Oct. 28, 2010.*
European Search Report dated Mar. 18, 2015 issued in counterpart application No. 14191284.0-1507.

*Primary Examiner* — Toan H Vu
(74) *Attorney, Agent, or Firm* — The Farrell Law Firm, P.C.

(57) ABSTRACT

A multi-language input method is provided. The method includes sensing a touch input for a letter entry, sensing a touch gesture consecutive to the touch input, and displaying a letter corresponding to the touch input and a symbol corresponding to the touch gesture.

10 Claims, 9 Drawing Sheets

(56) References Cited

U.S. PATENT DOCUMENTS

| | | | |
|---|---|---|---|
| 2010/0110017 A1* | 5/2010 | Lee | G06F 3/04886 345/173 |
| 2010/0245276 A1 | 9/2010 | Sim | |
| 2010/0259484 A1* | 10/2010 | Jo | G06F 3/018 345/171 |
| 2011/0009169 A1* | 1/2011 | Kim | G06F 1/1624 455/566 |
| 2012/0019471 A1* | 1/2012 | Schlipf | G06F 3/0236 345/173 |
| 2012/0056816 A1* | 3/2012 | Ettinger | G06F 3/04886 345/171 |
| 2012/0254786 A1* | 10/2012 | Colley | G06F 3/0233 715/773 |
| 2012/0293529 A1* | 11/2012 | Che | G06F 3/0236 345/589 |
| 2012/0326984 A1* | 12/2012 | Ghassabian | G06F 3/0236 345/168 |
| 2013/0090849 A1* | 4/2013 | Uetake | B61L 15/0045 701/522 |
| 2013/0234997 A1* | 9/2013 | Miyokawa | G06F 3/0418 345/178 |
| 2013/0305178 A1* | 11/2013 | Matsuzawa | G06F 3/0237 715/773 |
| 2014/0002420 A1* | 1/2014 | Huh | G06F 3/04886 345/178 |
| 2014/0078063 A1* | 3/2014 | Bathiche | G06F 3/0234 345/168 |
| 2014/0317547 A1* | 10/2014 | Bi | G06F 3/0482 715/773 |
| 2015/0100911 A1* | 4/2015 | Yin | G06F 3/04883 715/773 |
| 2015/0106700 A1* | 4/2015 | Allawi | G06F 17/24 715/256 |
| 2015/0121285 A1* | 4/2015 | Eleftheriou | G06F 3/04842 715/773 |
| 2016/0005150 A1* | 1/2016 | Ghassabian | G06F 3/0488 345/654 |
| 2016/0162162 A1* | 6/2016 | Liu | G06F 17/24 715/802 |

FOREIGN PATENT DOCUMENTS

| | | |
|---|---|---|
| KR | 1020100003831 | 1/2010 |
| KR | 10-1115035 | 2/2012 |
| WO | WO 2009/074278 | 6/2009 |

\* cited by examiner

MULTI-LANGUAGE INPUT METHOD AND MULTI-LANGUAGE INPUT APPARATUS USING THE SAME

PRIORITY

This application claims priority under 35 U.S.C. § 119(a) to a Korean Patent Application filed in the Korean Intellectual Property Office on Nov. 1, 2013 and assigned Serial No. 10-2013-0132092, the entire content of which is incorporated herein by reference.

BACKGROUND

1. Field of the Invention

The present invention generally relates to a multi-language input method and a multi-language input apparatus using the same, and more particularly, to a multi-language input method for displaying a letter including a symbol, such as accent, in response to a touch input and a touch gesture consecutive to the touch input and a multi-language input apparatus using the same.

2. Description of the Related Art

The portable device of today has become equipped with complicated functions, such as taking pictures or photographing moving images, the playback of music files or moving image files, games, the reception of broadcasting, the support of a wireless Internet, and has been implemented in a complex multimedia player form. Accordingly, a portable device is being developed in a new form, from a hardware or software viewpoint, in order to enhance portability and convenience while satisfying the needs of users.

As a portable device's convenience is increased, a user wants to use letter entry/edit functions, such as a memo, the transmission of e-mail, and the transmission of a message, more conveniently through the portable device. In particular, research is being carried out in order to increase convenience in entering multi-language letters because users in various countries use portable devices, and the user's need to input multi-language letters through Social Networking Services (SNS), etc. have increased.

Figure 1:
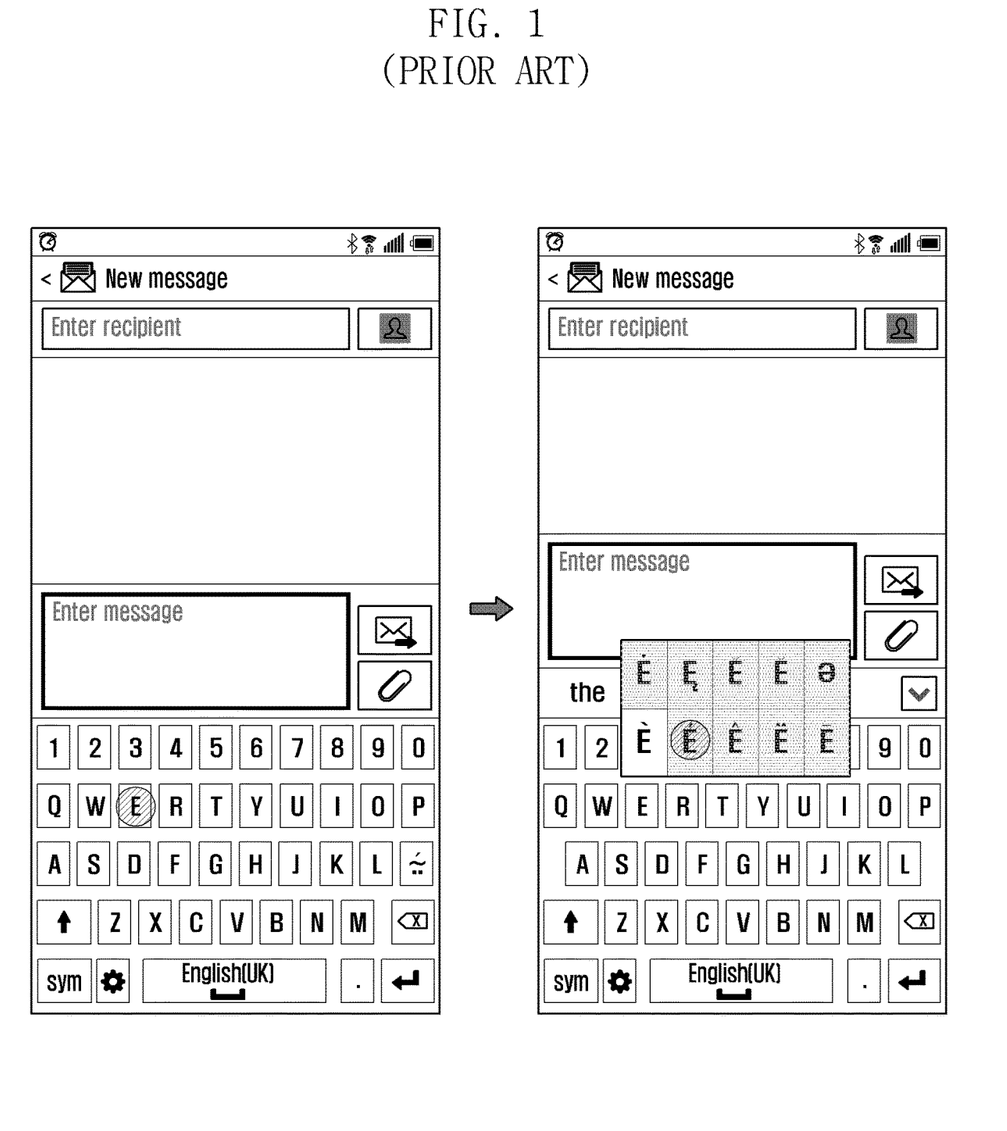
FIG. 1 is a diagram illustrating an example in which a multi-language letter is entered in a conventional portable device.

In accordance with conventional portable devices, there is a difficulty in entering a symbol that forms a multi-language letter, for example, an accent symbol. Referring to FIG. 1, multi-language letters, such as á, é, í, ó, ú, ñ, and ü, may include letters and accent symbols. In this case, in a conventional portable device, a user has to generate a long press input for an English letter as shown in the left part of FIG. 1 and then has to generate an input for selecting an accent symbol in a pop-up window that is generated in response to the long press input as shown in the right part of FIG. 1.

That is, a keypad included in a conventional portable terminal includes only the alphabet, and additional keys for letters including symbols are not assigned to the keypad. Accordingly, a user has to generate inputs twice in order to enter a letter including an accent symbol.

SUMMARY

The present invention has been made to solve at least the above problems and/or disadvantages and to provide at least the advantages below. Accordingly, an aspect of the present invention provides a multi-language input method for displaying a letter including a symbol in response to one touch and a touch gesture consecutive to the touch and a multi-language input apparatus using the same.

In accordance with an aspect of the present invention, a multi-language input method is provided. The method includes sensing a touch input for a letter entry, sensing a touch gesture consecutive to the touch input, and displaying a letter corresponding to the touch input and a symbol corresponding to the touch gesture.

In accordance with another aspect of the present invention, a multi-language input apparatus is provided. The apparatus includes an input unit configured to sense a user's input, a display unit configured to display information, and a control unit configured to sense a touch input for a letter entry and a touch gesture consecutive to the touch input, and to display a letter corresponding to the touch input and a symbol corresponding to the touch gesture.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Hereinafter, the present invention is described with reference to the accompanying drawings. Although specific embodiments of the present invention are illustrated in the drawings and a related detailed description is given, the present invention may be modified in various ways and the present invention may have several embodiments. Accordingly, the present invention is not intended to be limited to the specific embodiments, but it should be understood that the specific embodiments include all modifications, equivalents to substitutions that are included in the spirit and technical scope of the present invention. In relation to a description of the drawings, similar reference numerals are used throughout the drawings to refer to similar elements.

Terms, such as "include", "comprise", "may include" or "comprise", which may be used in the present disclosure invention, indicate the existence of a disclosed corresponding function, operation, element, etc., and do not limit one or more additional functions, operations, elements, etc. Furthermore, in the present disclosure invention, terms, such as "include", "comprise", or "have", are intended to indicate the existence of a characteristic, number, step, operation, element, component, or a combination of them in the specification, and should be understood to not exclude the existence of one or more other characteristics, numbers, steps, operations, elements, components, a combination of them, or the possibility addition of them.

In the present disclosure invention, a term "and/or" includes any of words listed together and all combinations of the words. For example, A and/or B may include A, may include B, or may include both A and B.

Furthermore, terms, such as "the first", "the second", "first", and "second", may indicate various elements of the present invention, but do not limit corresponding elements. For example, the terms do not limit order and/or importance of corresponding elements. The terms may be used to distinguish one element from other elements. For example, a first user device and a second user device are all user devices and are different user devices. A first element may be named a second element without departing from the scope of the present invention. Likewise, a second element may be named a first element.

When there is reference to one element described as being "connected to" or "coupled with" the other element, the one element may be directly connected to the other element or may be coupled with the other element, but it should be understood that a third element may be placed between the two elements. In contrast, when it is said that one element is described as being "directly connected to" or "directly coupled with" the other element, it should be understood that a third element is not placed between the two elements. Terms used in the present invention are used to only describe specific embodiments and are not intended to restrict the present invention. An expression of the singular number includes an expression of the plural number unless clearly defined otherwise in the context.

The term "module" used in the present disclosure may mean a unit that includes, for example, one of hardware, software, and firmware, or a combination of two or more of the hardware, software, and firmware. The term "module" may be interchangeably used instead of, for example, a unit, a logic, a logical block, a component, or a circuit. The term "module" may be a minimum unit of components that are integrally formed or a part of the minimum unit. The term "module" may be a minimum unit for performing one or more functions or a part of the minimum unit. The term "module" may be implemented mechanically or electronically. For example, the term "module" according to the present invention may include at least one of an Application-Specific Integrated Circuit (ASIC) chip, Field-Programmable Gate Arrays (FPGAs), and a programmable-logic device, which have been known or will be developed in the future and are configured to perform specific operations.

An input device according to the present invention may be a device including a communication function. For example, the input device may include one of or a combination of one or more of various devices, such as a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, an electronic bracelet, an electronic necklace, an electronic accessory, a camera, a wearable device, an electronic clock, a wrist watch, home appliances (e.g., a refrigerator, an air conditioner, a cleaner, an oven, a micro oven, a washing machine, or an air cleaner), an artificial intelligent robot, TV, a Digital Video Disk (DVD) player, an audio device, various medical devices (e.g., Magnetic Resonance Angiography (MRA), Magnetic Resonance Imaging (MRI), Computed Tomography (CT), a photographing device, and an ultrasonic device), a navigator, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a vehicle infotainment device, electronic equipment for ships (e.g., a navigation device for ships and a gyro compass), avionics, a security device, electronic clothes, an electronic key, a camcorder, a game console, a Head-Mounted Display (HMD), a flat panel display device, an electronic frame, an electronic album, furniture including a communication function, part of a building or structure, an electronic board, an electronic signature receiving device, or a projector. It is evident to those skilled in the art that the input device according to the present invention is not limited to the aforementioned devices.

Figure 2:
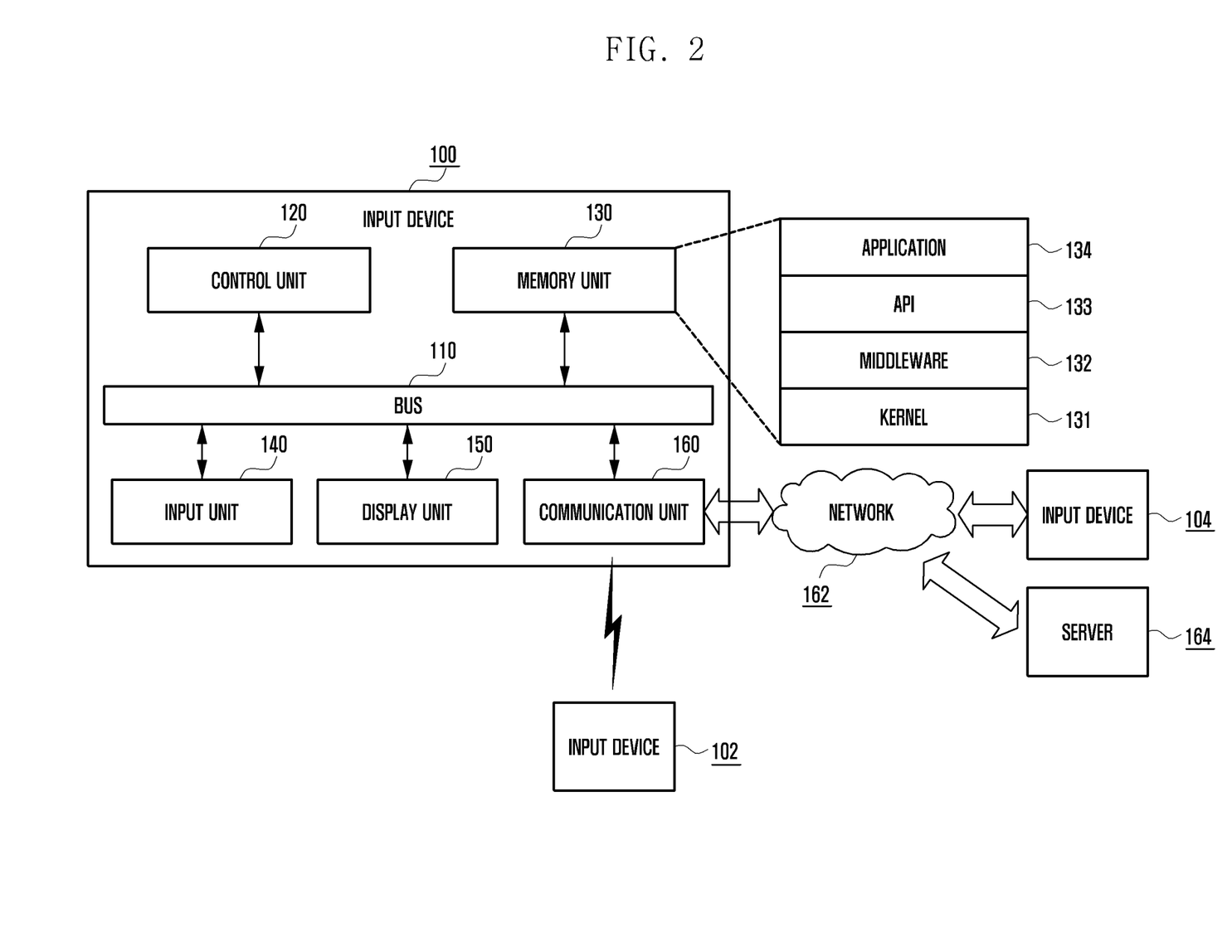
FIG. 2 is a block diagram illustrating the structure of an input device in accordance with an embodiment of the present invention.

FIG. 2 is a block diagram showing the structure of an input device in accordance with an embodiment of the present invention.

Referring to FIG. 2, the input device 100 includes a bus 110, a control unit 120, a memory unit 130, an input unit 140, a display unit 150 and a communication unit 160.

The bus 110 is a circuit for connecting the aforementioned elements and transferring communication (e.g., a control message) between the aforementioned elements.

The control unit 120 receives instructions from the aforementioned other elements (e.g., the memory unit 130, the input unit 140, the display unit 150, and the communication unit 160) through, for example, the bus 110, decrypts the instructions, and executes operations or data processing according to the decrypted instructions.

The memory unit 130 stores instructions or data received from the control unit 120 or other elements (e.g., the input unit 140, the display unit 150, and the communication unit 160) or generated from the control unit 120 or other elements. The memory unit 130 includes programming modules, for example, a kernel 131, a middleware 132, an Application Programming Interface (API) 133, and an application 134. Each of the aforementioned programming modules may consist of software, firmware, hardware, or a combination of two or more of the software, firmware, and hardware.

The kernel 131 controls or manages system resources (e.g., the bus 110, the control unit 120, and the memory unit 130) that are used to execute operations or functions implemented in the remaining other programming modules, for example, the middleware 132, the API 133, and the application 134. Furthermore, the kernel 131 provides an interface through which the elements of the input device 100 can be accessed, controlled, or managed in the middleware 132, the API 133, or the application 134.

The middleware 132 acts as an intermediary so that the API 133 or the application 134 can exchange data with the kernel 131 through communication. Furthermore, the middleware 132 executes load balancing for a task request using a method of assigning priority on which system resources (e.g., the bus 110, the control unit 120, and the memory unit 130) of the electronic device 100 can be used, for example, to at least one of a plurality of the applications 134 in relation to task requests received from the plurality of the applications 134.

The API 133 is an interface through which the application 134 can control functions provided by the kernel 131 or the middleware 132, and the API 133 includes, for example, at least one interface or function for control of a file, control of a window, video processing, or control of a letter.

The input unit 140 receives instructions or data from, for example, a user and transfers the instructions or data to the control unit 120 or the memory unit 130 through the bus 110.

The display unit 150 displays video, images, or data to a user.

The communication unit 160 connects communication between the input device 100 and other input devices 102 and 104. The communication unit 160 supports a specific short-range communication protocol (e.g., Wireless Fidelity (Wi-Fi), Bluetooth (BT), and Near Field Communication (NFC)) or specific network communication (e.g., the Internet, a Local Area Network (LAN), a Wide Area Network (WAN), a telecommunication network, a cellular network, a satellite network, and Plain Old Telephone Service (POTS)). Each of the other input devices 102 and 104 may be the same (e.g., the same type of) device as or a different (e.g., a different type of) device from the input device 100.

Figure 3:
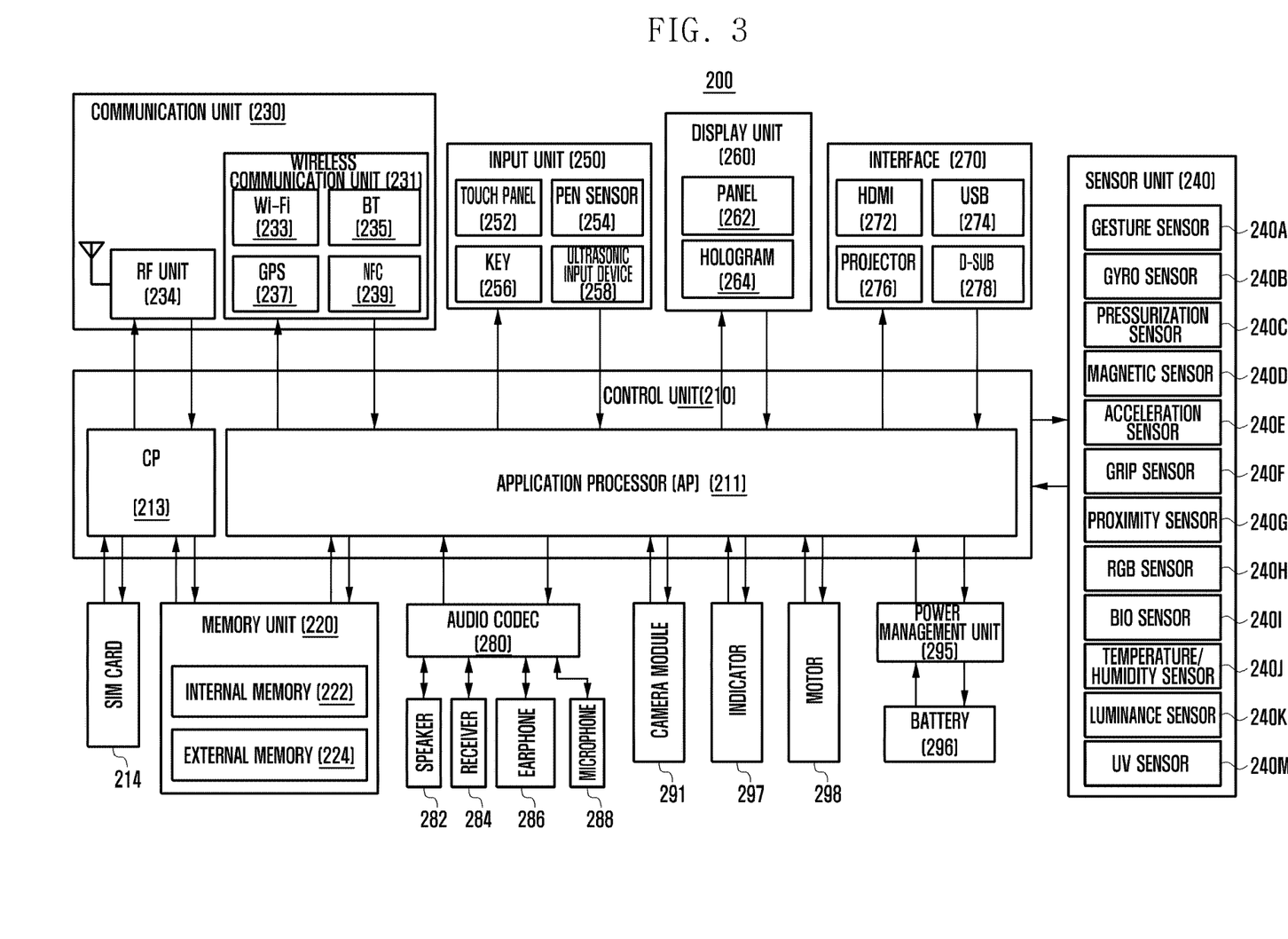
FIG. 3 is a block diagram illustrating the structure of hardware in accordance with an embodiment of the present invention.

FIG. 3 is a block diagram showing the structure of hardware in accordance with an embodiment of the present invention.

The hardware 200 may be, for example, the input device 100 as shown in FIG. 2. Referring to FIG. 3, the hardware 200 includes at least one control unit 210, at least one Subscriber Identification Module (SIM) card 214, at least one memory unit 220, at least one communication unit 230, at least one sensor unit 240, at least one input unit 250, at least one display unit 260, at least one interface 270, at least one audio codec 280, at least one camera module 291, at least one power management unit 295, at least one battery 296, at least one indicator 297, and at least one motor 298.

The control unit 210 (e.g., the control unit 120 as shown in FIG. 2) includes one or more Application Processors (APs) 211 and one or more Communication Processors (CPs) 213. The control unit 210 may be, for example, the control unit 120 as shown in FIG. 2. In FIG. 3, the AP 211 and the CP 213 are illustrated as being included in the control unit 210, but the AP 211 and the CP 213 may be included in different Integrated Circuit (IC) packages. The AP 211 and the CP 213 may be included in one IC package.

The AP 211 controls a plurality of hardware or software elements connected to the AP 211 by driving an operating system or application and performs various types of data processing and operation including multimedia data. The AP 211 may be implemented using, for example, a System on Chip (SoC). The control unit 210 may further include a Graphic Processing Unit (GPU).

The CP 213 performs a function of managing a data link and converting a communication protocol in communication between an input device (e.g., the input device 100) including the hardware 200 and other electronic devices connected to the input device over a network. The CP 213 may be, for example, implemented using a SoC. The CP 213 performs at least part of a multimedia control function. The CP 213 performs identification and authentication on a terminal within a communication network using a subscriber identification module (e.g., the SIM card 214). Furthermore, the CP 213 provides a user with services, such as a voice call, an image call, text messages, and packet data.

The CP 213 controls the transmission and reception of data of the communication unit 230. In FIG. 2, elements, such as the CP 213, the power management unit 295, and the memory unit 220 are illustrated as being elements separated from the AP 211. However, the AP 211 may be implemented to include at least some (e.g., the CP 213) of the aforementioned elements.

The AP 211 or the CP 213 loads instructions or data, received from a non-volatile memory or at least one of other elements connected to the AP 211 or the CP 213, onto a volatile memory and processes the loaded instructions or data. Furthermore, the AP 211 or the CP 213 stores data, received from at least one of other elements or generated from at least one of other elements, in a non-volatile memory.

The SIM card 214 is a card in which a subscriber identification module has been implemented and can be inserted into a slot that is formed at a specific position of the input device. The SIM card 214 may include unique identification information (e.g., an Integrated Circuit Card Identifier (ICCID)) or subscriber information (e.g., an International Mobile Subscriber Identity (IMSI)).

The memory unit 220 includes internal memory 222 or external memory 224. The memory unit 220 may be, for example, the memory unit 130 as shown in FIG. 1. The internal memory 222 may include at least one of, for example, volatile memory (e.g., Dynamic RAM (DRAM), Static RAM (SRAM), or Synchronous Dynamic RAM (SDRAM)) and non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, or NOR flash memory). In accordance with one embodiment, the internal memory 222 may have a Solid State Drive (SSD) form. The external memory 224 may further include a flash drive, for example, a Compact Flash (CF), Secure Digital (SD), micro-Secure Digital (SD), mini-SD, extreme Digital (xD), or a memory stick.

The communication unit 230 includes a wireless communication unit 231 and an RF unit 234. The communication unit 230 may be, for example, the communication unit 160 as shown in FIG. 1. The wireless communication unit 231 may include, for example, Wi-Fi 233, BT 235, a GPS 237, or NFC 239. The wireless communication unit 231 provides a wireless communication function using a radio frequency. The wireless communication unit 231 may further include a network interface (e.g., a LAN card) or a modem for connecting the hardware 200 to a network (e.g., the Internet, an LAN, a WAN, a telecommunication network, a cellular network, a satellite network, or Plain Old Telephone Service (POTS)).

The RF unit 234 is responsible for the transmission and reception of data, for example, the transmission and reception of an RF signal or a called electronic signal. Although not shown, the RF unit 234 may include, for example, a transceiver, a Power Amp Module (PAM), a frequency filter, or a Low Noise Amplifier (LNA). The RF unit 234 may further include a component for transmitting and receiving electromagnetic waves on the free space in wireless communication, for example, a conductor or a conductive line.

The sensor unit 240 includes at least one of, for example, a gesture sensor 240A, a gyro sensor 240B, a pressurization sensor 240C, a magnetic sensor 240D, an acceleration sensor 240E, a grip sensor 240F, a proximity sensor 240G, a Red, Green, Blue (RGB) sensor 240H, a bio sensor 240I, a temperature/humidity sensor 240J, a luminance sensor 240K, and an ultraviolet (UV) sensor 240M. The sensor unit 240 measures a physical amount or senses the operation state of an electronic device and converts the measured or sensed information into an electrical signal. The sensor unit 240 may further include, for example, an E-nose sensor, an electromyography (EMG) sensor, an electroencephalogram (EEG) sensor, an electrocardiogram (ECG) sensor, or a fingerprint sensor. The sensor unit 240 may further include a control circuit for controlling one or more sensors therein.

The input unit 250 includes a touch panel 252, a digital pen sensor 254, a key 256, or an ultrasonic input device 258. The input unit 250 may be the input unit 140 shown in FIG. 1, for example. The touch panel 252 recognizes a touch input using at least one of, for example, a capacitive method, a resistive method, an infrared method, and an ultrasonic method. Furthermore, the touch panel 252 may include a controller. In the case of a capacitive method, the touch panel 252 performs proximity recognition in addition to a direct touch. The touch panel 252 may further include a tactile layer. In this case, the touch panel 252 provides a user with a tactile response.

The digital pen sensor 254 may be implemented, for example, using a method of receiving a user's touch input or a similar method or using an additional sheet for recognition. A keypad or a touch key may be used as the key 256. The ultrasonic input device 258 is capable of confirming data by sensing sound waves from a terminal to a microphone (e.g., a microphone 288) through a pen that generates an ultrasonic signal and capable of wireless recognition. The hardware 200 may receive a user's input from an external device (e.g., a network, a computer, or a server) connected to the hardware 200 using the communication unit 230.

The display unit 260 includes a panel 262 or a hologram 264. The display unit 160 may be, for example, the display unit 150 as shown in FIG. 1. The panel 262 may be, for example, a Liquid Crystal Display (LCD) or Active-Matrix Organic Light-Emitting Diodes (AM-OLED). The panel 262 may be implemented to be flexible, transparent, or wearable. The panel 262, together with the touch panel 252, may be formed into one module. The hologram 264 displays a stereoscopic image into the air using the interference of light. The display unit 160 may further include a control circuit for controlling the panel 262 or the hologram 264.

The interface 270 includes, for example, a High-Definition Multimedia Interface (HDMI) 272, a Universal Serial Bus (USB) 274, a projector 276, or a D-subminiature (D-sub) 278. The interface 270 may include, for example, a Secure Digital (SD)/Multi-Media Card (MMC) or an Infrared Data Association (IrDA).

The audio codec 280 converts voice into an electrical signal, and vice versa. For example, the audio codec 280 converts voice information that is inputted or outputted through a speaker 282, a receiver 284, an earphone 286, or the microphone 288.

The camera module 291 is a device capable of photographing video and capturing moving images. The camera module 291 may include one or more image sensors (e.g., a front lens or a rear lens), an Image Signal Processor (ISP), or a flash LED.

The power management unit 295 manages power for the hardware 200. Although not shown, the power management unit 295 may include, for example, a Power Management Integrated Circuit (PMIC), a charger Integrated Circuit (IC), or a battery fuel gauge.

The PMIC may be mounted on, for example, an IC or a SoC semiconductor. A charging method may be divided into a wired method and a wireless method. The charger IC charges a battery and prevents the introduction of overvoltage or an overcurrent from a charger. The charger IC may include a charger IC for at least one of a wired charging method and a wireless charging method. The wireless charging method may include, for example, a magnetic resonance method, a magnetic induction method, or an electromagnetic wave method. Additional circuits for wireless charging, for example, a coil loop, a resonant circuit, and a rectifier may be added.

The battery fuel gauge measures, for example, the remaining amount of the battery 296 and voltage, current, or temperature during charging. The battery 296 generates electricity and supplies power and may be, for example, a rechargeable battery.

The indicator 297 displays a specific state, for example, a booting state, a message state, or a charging state of the hardware 200 or part (e.g., the AP 211) of the hardware 200. The motor 298 converts an electrical signal into mechanical vibration. The MCU 299 controls the sensor unit 240.

Although not shown, the hardware 200 may include a processing device (e.g., GPU) for supporting mobile TV. The processing device for supporting mobile TV processes media data according to standards, such as Digital Multimedia Broadcasting (DMB), Digital Video Broadcasting (DVB), and a media flow. Each of the aforementioned elements of the hardware according to the present invention may be formed of one or more components, and the name of a corresponding element may be changed depending on the type of electronic device. The hardware according to the present invention may be configured to include at least one of the aforementioned elements, and some of the aforementioned elements may be omitted, or additional other elements may be further included in the aforementioned elements. Furthermore, when some of the elements of the hardware according to the present invention are combined to form one entity, they can perform the same function as corresponding elements before they are combined.

Figure 4:
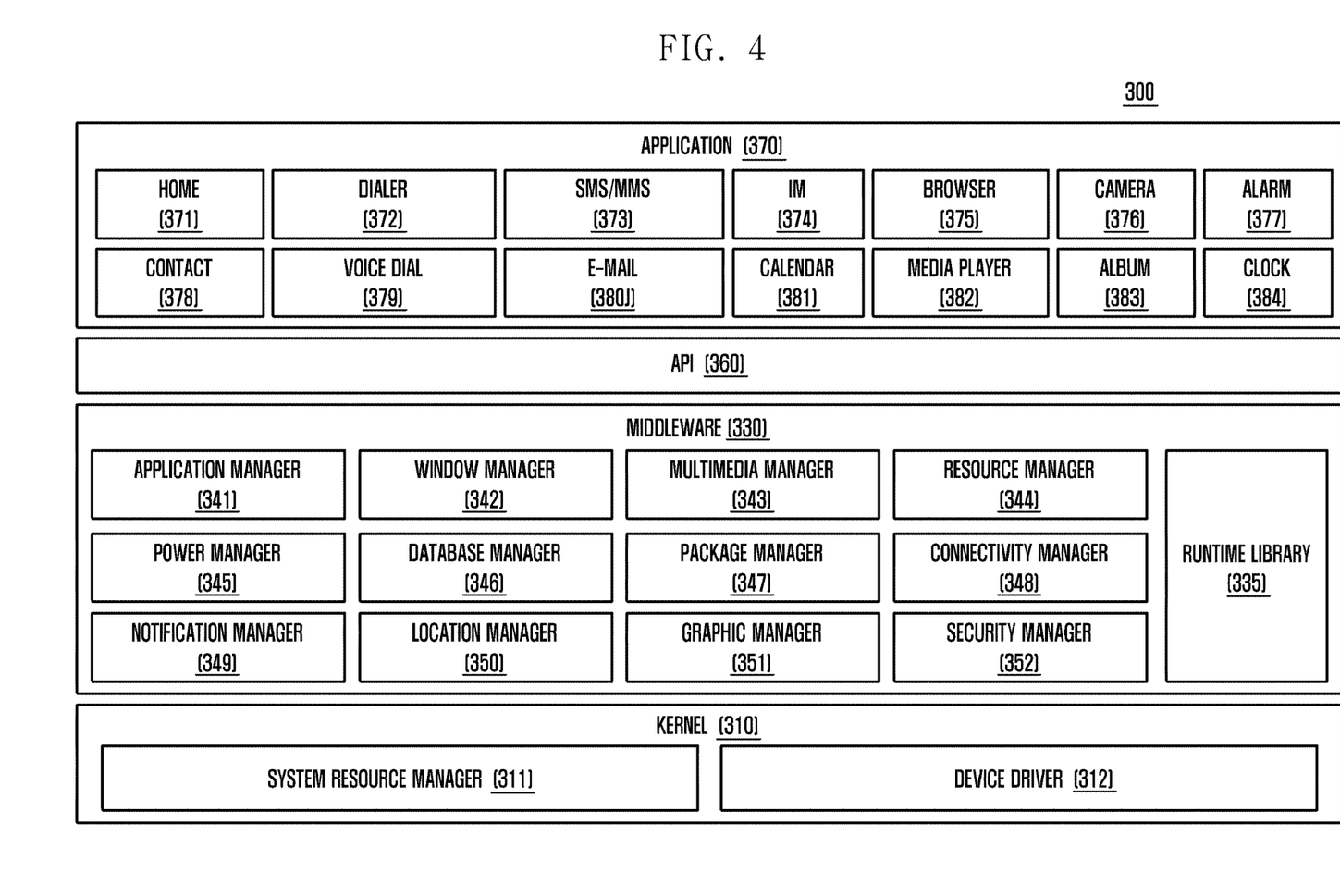
FIG. 4 is a block diagram illustrating the structure of a programming module in accordance with an embodiment of the present invention.

FIG. 4 is a block diagram illustrating the structure of a programming module in accordance with an embodiment of the present invention. The programming module 300 is included (e.g., stored) in the input device 100 (e.g., the memory unit 130) as shown in FIG. 2. At least part of the programming module 300 may be formed of software, firmware, hardware, or a combination of two or more of the software, firmware, and hardware. The programming module 300 may include an Operating System (OS) implemented in hardware (e.g., the hardware 200) and configured to control resources related to a portable device (e.g., the portable device 100) or various applications (e.g., the application 370) driven on an OS. For example, the OS may be Android, iOS, Windows, Symbian, Tizen, or Bada. Referring to FIG. 3, the programming module 300 includes a kernel 310, middleware 330, an API 360, or an application 370.

The kernel 310 (e.g., the kernel 131 as shown in FIG. 2) may include a system resource manager 311 or a device driver 312. The system resource manager 311 may include, for example, a control unit management unit 313, a memory unit management unit 315, or a file system management unit 316. The system resource manager 311 performs control, assignment, recovery, etc. on system resources. The device driver 312 may include, for example, a display driver 314, a camera driver 316, a Bluetooth driver 318, a sharing memory unit driver 320, a USB driver 322, a keypad driver 324, a Wi-Fi driver 326, or an audio driver 328. Furthermore, the device driver 312 may include an Inter-Process Communication (IPC) driver.

The middleware 330 includes a plurality of modules that has been previously implemented in order to provide a function that is necessary for the application 370 in common. Furthermore, the middleware 330 provides a function through the API 360 so that the application 370 can efficiently use limited system resources within a portable device. For example, as shown in FIG. 4, the middleware 330 (e.g., the middleware 132) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that is used by a compiler in order to add a new function through a programming language while the application 370 is executed. The runtime library 335 performs functions, such as input and output, the management of the memory unit, or a function for a calculation function.

The application manager 341 manages the life cycle of, for example, at least one of the applications 370. The window manager 342 manages GUI resources used in a screen. The multimedia manager 343 recognizes a format necessary to play back various media files and encodes and decodes a media file using a codec suitable for a corresponding format. The resource manager 344 manages resources, such as the source code, memory unit, or memory space of at least one of the applications 370.

The power manager 345, together with a Basic Input/Output System (BIOS), manages the battery or a power source and provides power information necessary for an operation. The database manager 346 manages a database to be used in at least one of the applications 370 so that the database can be generated, searched, and changed. The package manager 347 manages the installation or update of an application that is distributed in a package file form.

The connectivity manager 348 manages a wireless connection, for example, Wi-Fi or Bluetooth. The notification manager 349 displays an event, such as an arrival message, an agreement, or proximity notification, or notifies a user of the event in such a manner that the display or notification of the event does not hinder the user. The location manager 350 manages information about the location of a portable device. The graphic manager 351 manages graphic effects to be provided to a user or a user interface related to the graphic effects. The security manager 352 provides a general security function necessary for system security or user authentication. If a portable device (e.g., the portable device 100) has a telephone function, the middleware 330 may further include a telephony manager to provide the voice or video telephony function of a portable device.

The middleware 330 generates and uses a new middleware module through a combination of various functions of the aforementioned internal element modules. The middleware 330 provides a module that is specific to the type of OS in order to provide a different function. Furthermore, the middleware 330 may dynamically delete some of existing elements or add new elements to existing elements. Accordingly, the middleware 330 may omit some of the elements, further include other elements, or replace existing elements with elements having different names and performing similar functions.

The API 360 (e.g., the API 133 as shown in FIG. 2) is a set of API programming functions and may be provided with a different construction depending on an OS. For example, in the case of Android or iOS, for example, one API set may be provided to each platform. In the case of Tizen, for example, two or more API sets may be provided to each platform.

The application 370 (e.g., the application 134 as shown in FIG. 2) may include, for example, a preloaded application or a third party application.

At least part of the programming module 300 may be implemented using an instruction stored in a computer-readable storage medium. If the instruction is executed by one or more control units (e.g., the control unit 210), the one or more control units can execute a function corresponding to the instruction. A computer-readable storage medium may be, for example, the memory unit 260. At least part of the programming module 300 may be implemented (e.g., executed) by the control unit 210, for example. At least part of the programming module 300 may include, for example, a module, a program, a routine, sets of instructions and/or a process for performing one or more functions.

The names of the elements of a programming module according to the present invention may vary depending on the type of OS. The programming module according to the present invention may include one or more of the aforementioned elements, omit some of the aforementioned elements, or further include additional other elements. Operations performed by the programming module according to the present invention or by other elements can be processed sequentially, in parallel, repeatedly, or heuristically. Furthermore, some of the operations performed by the programming module may be omitted, or other operations may be added to the operations performed by the programming module.

A multi-language input method of the input device 100 according to the present invention is described below in detail.

Hereinafter, the control unit 120 sensing a touch input is described, but the present invention is not limited thereto. For example, the control unit 120 may perform the same operations described below when a hovering input, a finger gesture, etc. is sensed.

Figure 5:
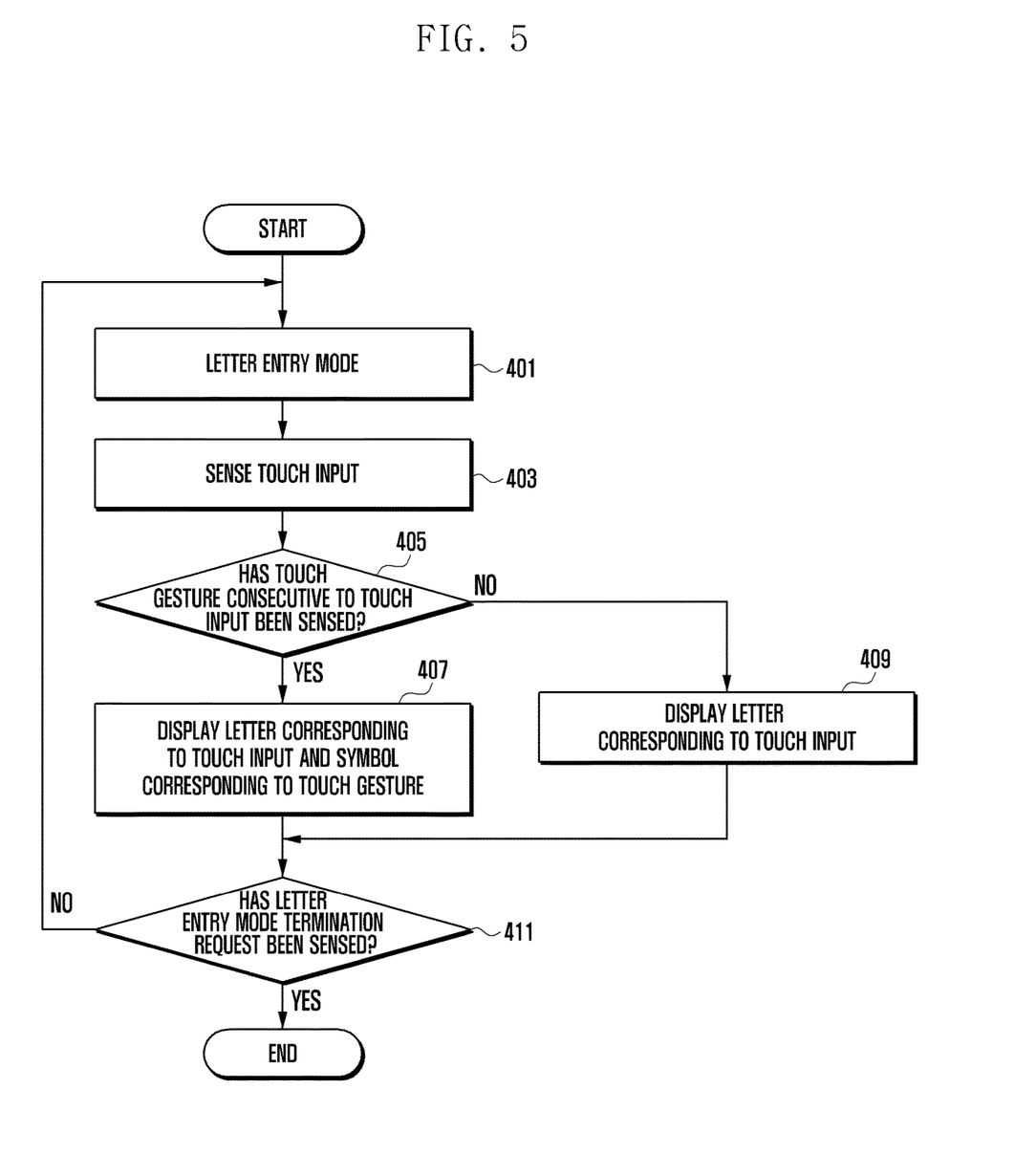
FIG. 5 is a flowchart illustrating a multi-language input method in accordance with an embodiment of the present invention.

FIG. 5 is a flowchart illustrating a multi-language input method in accordance with an embodiment of the present invention.

Referring to FIG. 5, the control unit 120 operates in letter entry mode in step 401.

When an application, a program, or a service that provides a document writing function is driven, the control unit 120 operates in letter entry mode. The application that provides the document writing function may be an application that provides functions related to a note pad, a text message, an e-mail, a Social Networking Service (SNS), a diary, and an e-book.

In letter entry mode, the control unit 120 senses a user's input for a letter entry, such as inputting, editing, and deleting a letter, and performs an operation corresponding to the user's input. In letter entry mode, the control unit 120 controls the display unit 150 so that at least one of a letter entry region and a keypad is displayed. If a hardware key is included in the input device 100, the control unit 120 may not display a keypad. If a hardware key is not included in the input device 100, the control unit 120 displays a keypad as a software key. The keypad may be, for example, a Qwerty keyboard, the Cheonji-in keyboard, the Cheonji-in Plus keyboard, the Sky keyboard, or the Naratgeul keyboard.

The control unit 120 senses a touch input in step 403.

The control unit 120 senses a user's touch input through the input unit 140. The input unit 140 senses the touch input and transfers a control signal corresponding to the sensed touch input to the control unit 120. The control unit 120 senses that the touch input has been generated by analyzing the received control signal. The control unit 120 obtains information about a location where the touch input has been generated by analyzing the control signal.

When the touch input is sensed in a letter entry region, the control unit 120 performs an operation for entering a letter at a location corresponding to the touch input. For example, the control unit 120 controls the display unit 150 so that a cursor is placed at the location corresponding to the touch input.

When the touch input is sensed in a keypad, the control unit 120 identifies a letter corresponding to the touch input on a keypad based on information about the location where the touch input was generated. The letter may be Hangul, Chinese, the Roman alphabet, the Arabic alphabet, the Cyrillic alphabet, Hiragana, and so on. In the following description, it is assumed that a letter corresponding to a touch input is the Roman alphabet, that is, the alphabet. The control unit 120 identifies a letter corresponding to the touch input based on information about the location where the touch input was generated. The identified alphabet is illustrated as being, for example, 'e', 'n', and 'u' in FIGS. 6 and 7.

The control unit 120 determines whether a touch gesture consecutive to the touch input has been sensed in step 405.

The control unit 120 senses the touch gesture through the input unit 140. The input unit 140 senses the touch gesture and transfers a control signal corresponding to the sensed touch gesture to the control unit 120. The control unit 120 senses that the touch gesture has been generated by analyzing the received control signal.

The touch gesture may be an input that forms a specific shape between a first point at which the touch input is generated and a second point at which the touch input is ended. The touch gesture may be referred to as a gesture input, a drag input, a touch & drag input, a swipe input, and the like.

The control unit 120 determines whether the touch gesture has been sensed in succession to the touch input. For example, if a touch input is generated and a touch gesture is sensed when the touch input has not been terminated, the control unit 120 determines that the touch gesture consecutive to the touch input has been sensed. As another example, if a touch input is generated and a touch gesture is sensed within a predetermined time after the touch input was terminated, the control unit 120 determines that the touch gesture consecutive to the touch input has been sensed.

If a touch gesture consecutive to a touch input is sensed, the control unit 120 identifies a moving direction, a moving distance, a trace, etc. of the touch gesture by analyzing a control signal received from the input unit 140. The control unit 120 identifies a symbol corresponding to the touch gesture based on analyzed information. The symbol may be an accent symbol, such as ', ", ~, ˇ, or ˉ, but is not limited thereto. In the following description, it is assumed that a symbol corresponding to a touch gesture is an accent symbol.

Figure 6:
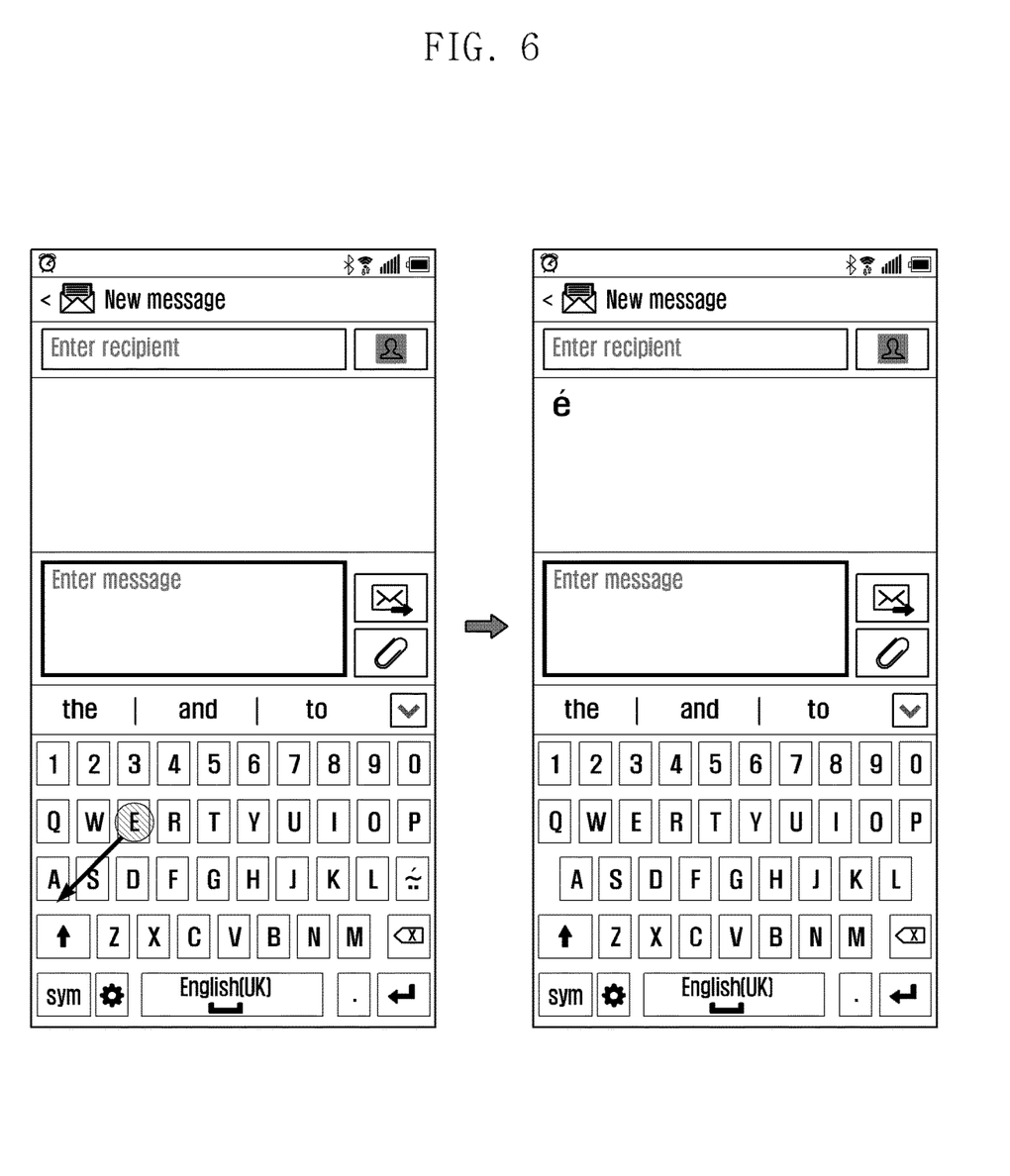
FIGS. 6 to 8 are diagrams illustrating examples in which a multi-language is entered according to the multi-language input method in accordance with an embodiment of the present invention.
Figure 7:
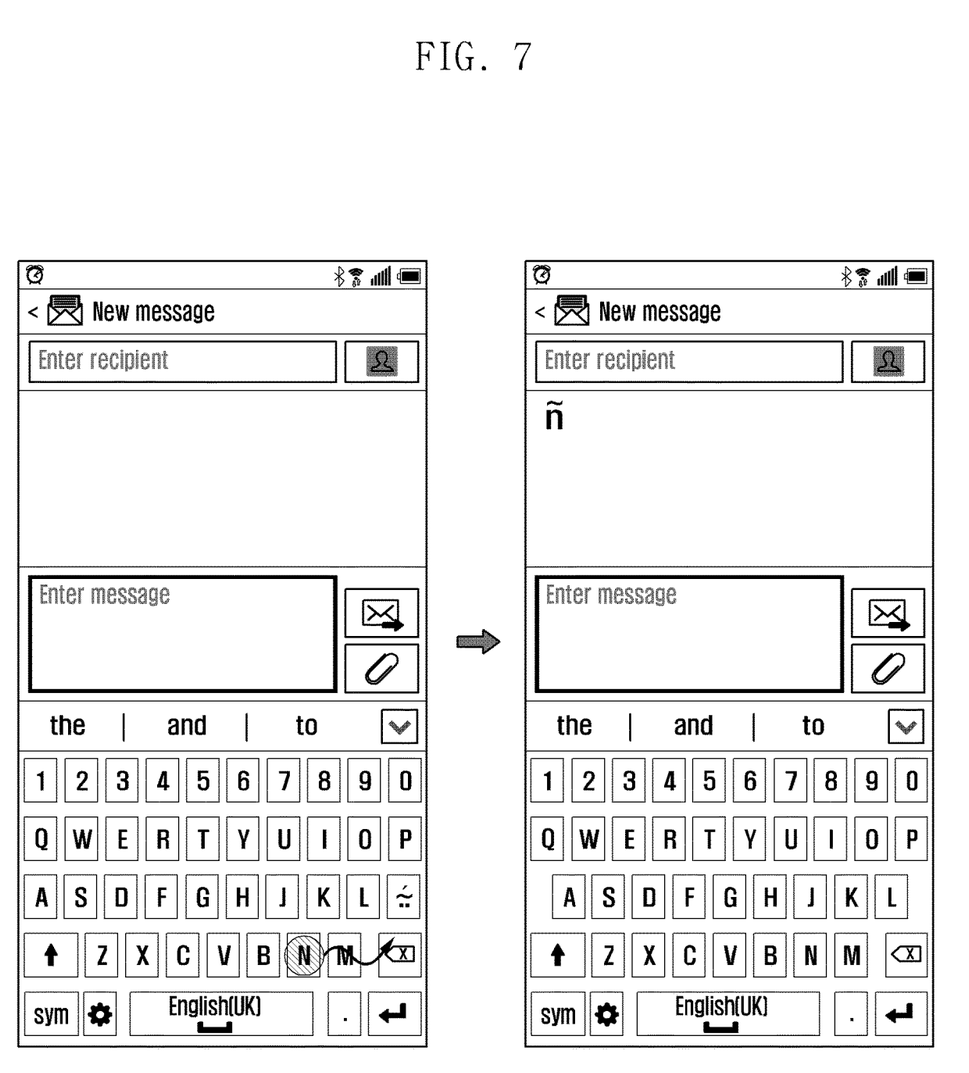
Figure 8:
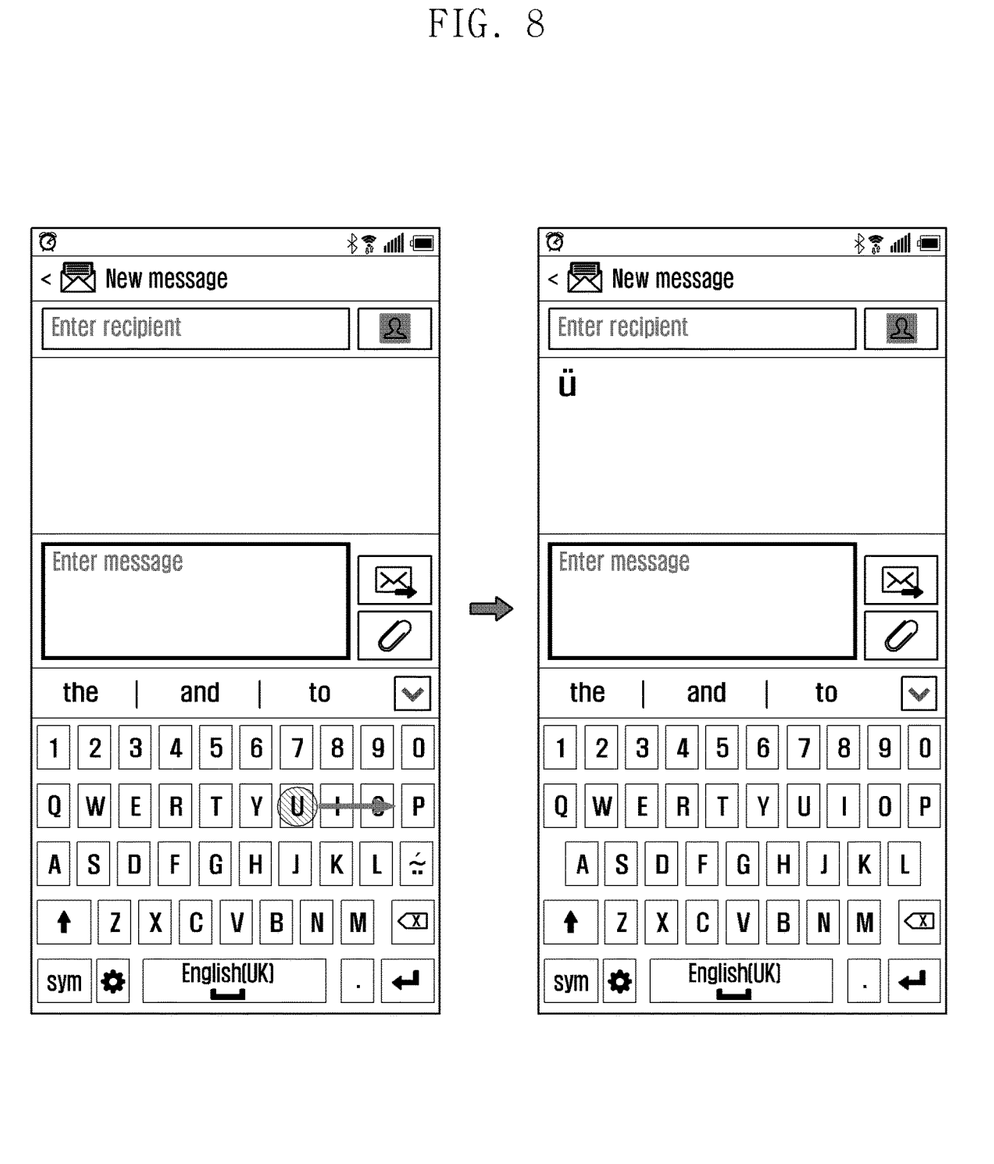

As shown in FIGS. 6 and 7, a symbol corresponding to a touch gesture may have a trace that is the same as the trace of the touch gesture. If a touch gesture is input which moves from a first point at which a touch input was generated to the left in an oblique line and then ends at a second point as shown in FIG. 6, a symbol corresponding to the touch gesture may be '. If a touch gesture is input which moves from a first point at which a touch input was generated while drawing a trace of a wave form and then ends at a second point as shown in FIG. 7, a symbol corresponding to the touch gesture may be ~. As shown in FIG. 8, a symbol corresponding to a touch gesture may not have the same trace as the trace of the touch gesture. If a touch gesture is input which moves from a first point at which a touch input was generated to the right and then ends at a second point as shown in FIG. 8, a symbol corresponding to the touch gesture may be ".

A symbol corresponding to a touch gesture may correspond to a moving direction, a moving distance, etc. of the touch gesture.

When the touch gesture consecutive to the touch input is sensed, the control unit 120 displays a letter corresponding to the touch input and a symbol corresponding to the touch gesture in step 407.

The control unit 120 controls the display unit 150 so that the letter identified as corresponding to the touch input and the symbol identified as corresponding to the touch gesture are displayed.

The control unit 120 may combine and display the identified letter and the identified symbol. The control unit 120 may identify a letter that includes the identified letter and the identified symbol and displays the identified letter.

If the identified letter and the identified symbol are combined and displayed, the control unit 120 may combine the symbol with the letter in a specific direction on the basis of the letter and display the combined letter. FIGS. 6 to 8 illustrate examples in which the control unit 120 combines a symbol and a letter so that the symbol is placed on top of the letter and displays the combined letter. However, the present invention is not limited to, and the control unit 120 may combine a letter and a symbol so that the symbol is placed on the left, right, or bottom of the letter and display the combined letter.

The combination direction of a symbol may be determined by the type of letter that forms a multi-language. In FIG. 6, if a user enters the Roman alphabet, a symbol ' combined with a letter e can be placed only on top of the letter e in accordance with the type of letter that forms the Roman alphabet. Accordingly, the control unit 120 can combine the symbol ' and the letter e so that the symbol ' is placed on top of the letter e and display the combined letter.

The combination direction of a symbol may be determined in response to a sensed touch input and/or a sensed touch gesture. For example, the control unit 120 may determine the direction in which a touch gesture has moved, that is, the combination direction of a symbol, based on a corresponding relation between a first point and a second point. For example, if a second point is placed on the right of a first point, the control unit 120 may combine a letter and a symbol so that the symbol is placed on the right of the letter.

The combination direction of a symbol may be determined in response to a determined letter and/or a determined symbol. For example, if a symbol is identified as being a parenthesis symbol (e.g., (,), or ˆ), the control unit 120 may combine a letter and the symbol so that the symbol is placed in the direction in which the parenthesis is closed on the basis of the letter (e.g., (e, e), or ê).

If an identified letter and an identified symbol are combined and displayed, the control unit 120 may display the letter and symbol depending on a predetermined distance. The predetermined distance may be variably determined so that the letter and the symbol are in one font, but is not limited thereto. The predetermined distance may be variably determined depending on an application or a program that provides letter writing mode or the type, characteristics, etc. of an input device that provides letter writing mode.

FIGS. 6 to 8 show examples in which both an identified letter and an identified symbol are displayed in a display region. The control unit 120 can control the display unit 150 so that a letter and a symbol are displayed in a letter entry region.

The control unit 120 determines whether a letter corresponding to a touch input can be combined with a symbol. If a letter corresponding to a touch input can be combined with a symbol, the control unit 120 combines a symbol corresponding to a touch gesture with the letter and display the combined letter. Furthermore, the control unit 120 determines whether a symbol corresponding to a touch gesture can be identified. If a symbol corresponding to a touch gesture can not be identified, the control unit 120 may display only a letter. Such an embodiment is described in detail below with reference to FIG. 9.

If, as a result of the determination, a touch gesture consecutive to the touch input is not sensed, the control unit 120 displays the letter corresponding to the touch input in step 409.

If, as a result of the determination, a touch gesture consecutive to the touch input is not sensed, the control unit 120 controls the display unit 150 so that only the letter corresponding to the touch input is displayed. In such a case, the operation of the control unit 120 is the same as a common letter entry operation.

The control unit 120 determines whether a letter entry mode termination request is sensed in step 411.

The letter entry mode termination request may be generated in response to a user's input. The letter writing mode termination request may be generated in response to a selective menu or icon input corresponding to "close", "store", or "end". The control unit 120 determines whether the letter entry mode termination request has been generated based on a control signal received through the input unit 140.

If, as a result of the determination, the letter entry mode termination request is generated, the control unit 120 terminates the multi-language input operation according to the present invention. The control unit 120 performs corresponding operations, such as the automatic storage of a written document and the termination of an application, in response to the letter entry termination request.

If, as a result of the determination, the letter entry mode termination request is not sensed, the control unit 120 may return to letter entry mode and repeatedly perform the multi-language input operation according to the present invention.

Figure 9:
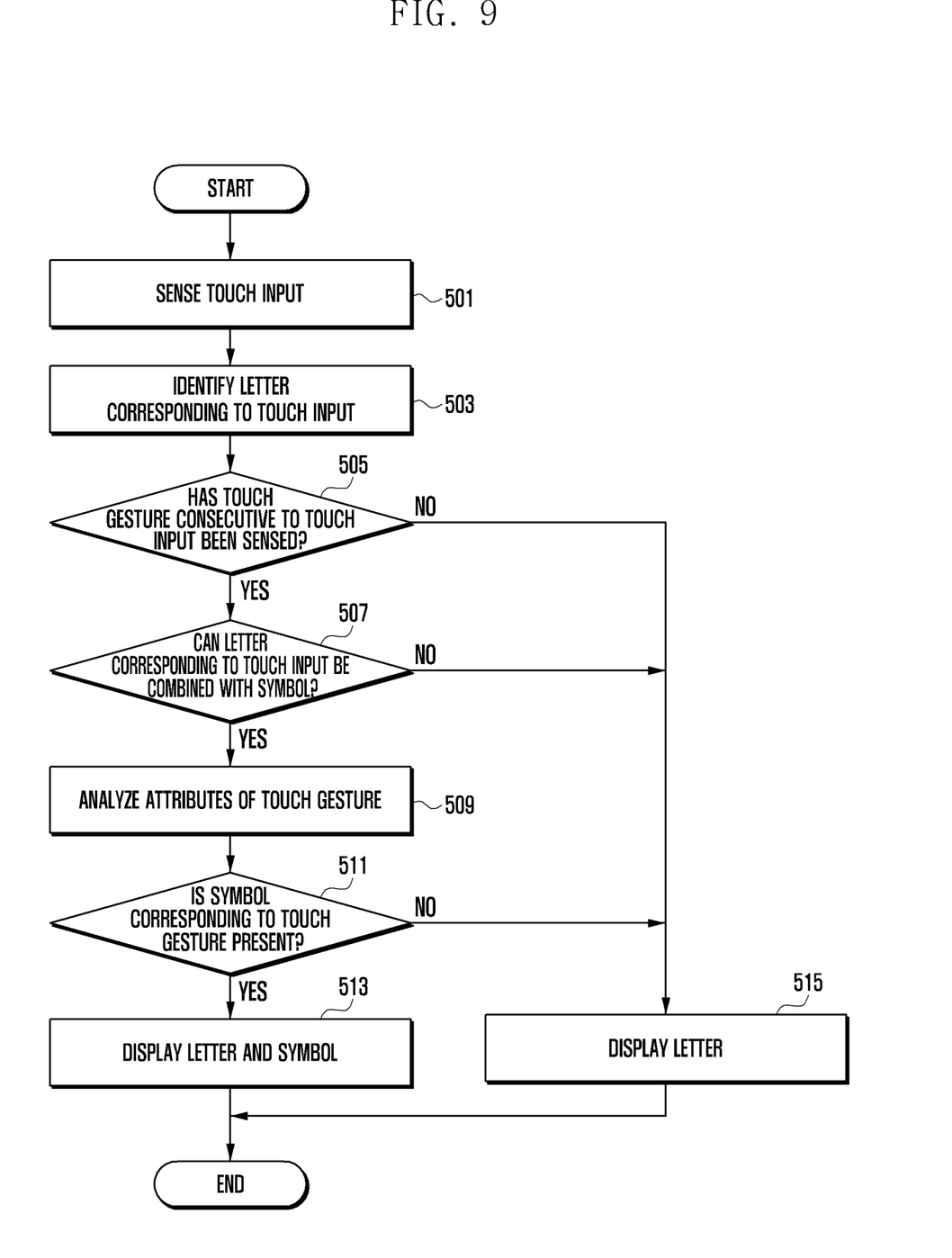
FIG. 9 is a flowchart illustrating the multi-language input method in accordance with an embodiment of the present invention.

FIG. 9 is a flowchart illustrating the multi-language input method in accordance with an embodiment of the present invention.

Referring to FIG. 9, the control unit 120 senses a touch input in step 501.

The control unit 120 senses a user's touch input through the input unit 140. The input unit 140 senses the touch input and transfers a control signal corresponding to the sensed touch input to the control unit 120. The control unit 120 senses that the touch input has been generated by analyzing the received control signal. The control unit 120 obtains information about a location where the touch input has been generated by analyzing the control signal.

When the touch input is sensed in a letter entry region, the control unit 120 performs an operation for entering a letter at a location corresponding to the touch input. For example, the control unit 120 controls the display unit 150 so that a cursor is placed at the location corresponding to the touch input.

The control unit 120 identifies a letter corresponding to the touch input in step 503.

The control unit 120 can identify a letter corresponding to the touch input on a keypad based on information about the location where the touch input was generated. The letter may be Hangul, Chinese, the Roman alphabet, the Arabic alphabet, the Cyrillic alphabet, Hiragana, and the like. For example, the control unit 120 identifies a letter corresponding to the touch input based on information about the location where the touch input was generated.

The control unit 120 determines whether a touch gesture consecutive to the touch input has been sensed in step 505.

The control unit 120 senses the touch gesture through the input unit 140. The input unit 140 senses the touch gesture and transfers a control signal corresponding to the sensed touch gesture to the control unit 120. The control unit 120 senses that the touch gesture has been generated by analyzing the received control signal.

The touch gesture may be input that forms a specific shape between a first point where the touch input is generated and a second point where the touch input is terminated. The touch gesture may be named a gesture input, a drag input, a touch & drag input, a swipe input, and the like.

The control unit 120 determines whether the touch gesture has been sensed in succession to the touch input. For example, if a touch input is generated and a touch gesture is sensed when the touch input has not been terminated, the control unit 120 may determine that the touch gesture consecutive to the touch input has been sensed. As another example, if a touch input is generated and a touch gesture is sensed within a predetermined time after the touch input was terminated, the control unit 120 may determine that the touch gesture consecutive to the touch input has been sensed.

If, as a result of the determination, a touch gesture consecutive to the touch input is not sensed, the control unit 120 displays the letter corresponding to the touch input in step 515.

If, as a result of the determination, a touch gesture consecutive to the touch input is sensed, the control unit 120 determines whether the letter corresponding to the touch input can be combined with a symbol in step 507.

Whether a letter can be combined with a symbol may be determined by the type of letter that forms a multi-language. The control unit 120 determines whether an identified letter and a letter combined with a symbol are included in the letters of a corresponding multi-language in the type of letters that form a multi-language that is being written. If the identified letter and the letter combined with the symbol are not present in the type of letters that form the corresponding multi-language, the control unit 120 may determine that the letter cannot be combined with the symbol. If the identified letter and the letter combined with the symbol are present in the type of letters that form the corresponding multi-language, the control unit 120 may determine that the letter can be combined with the symbol.

If, as a result of the determination, the letter corresponding to the touch input can be combined with a symbol, the control unit 120 analyzes the attributes of the touch gesture in step 509.

The control unit 120 determines a moving direction, a moving distance, a trace, etc. of the touch gesture by analyzing a control signal received from the input unit 140.

The control unit 120 determines whether a symbol corresponding to the touch gesture is presented in step 511.

The control unit 120 identifies a symbol corresponding to the touch gesture based on analyzed information. The symbol may be an accent symbol, such as ', ", ~, ˘, or ˜, but is not limited thereto.

A symbol corresponding to a touch gesture may have a same trace as the trace of the touch gesture. A symbol corresponding to a touch gesture may correspond to a moving direction, a moving distance, etc. of the touch gesture.

The control unit 120 determines whether a symbol corresponding to a touch gesture is sensed. That is, the control unit 120 determines whether a symbol corresponding to a touch gesture is present. A corresponding relation between a touch gesture and a symbol may have been stored in the memory unit 130 when manufacturing the input device 100. The control unit 120 determines whether a symbol corresponding to a touch gesture is presented based on the stored relation.

If, as a result of the determination, a symbol corresponding to the touch gesture is not present, the control unit 120 displays the letter corresponding to the touch input in step 515.

If, as a result of the determination, a symbol corresponding to the touch gesture is present, the control unit 120 displays the letter corresponding to the touch input and the symbol corresponding to the touch gesture in step 513.

The control unit 120 controls the display unit 150 so that the letter identified as corresponding to the touch input and the symbol identified as corresponding to the touch gesture are displayed.

The control unit 120 may combine and display the identified letter and the identified symbol. The control unit 120 may identify a letter formed as the combination of the identified letter and the identified symbol, and display the identified letter.

If an identified letter and an identified symbol are combined and displayed, the control unit 120 may combine the symbol with the letter in a specific direction on the basis of the letter and display the combined letter. The combination direction of a symbol may be determined by the type of letter that forms a multi-language. The combination direction of a symbol may be determined in response to a sensed touch input and/or a sensed touch gesture.

If an identified letter and an identified symbol are combined and displayed, the control unit 120 may display the letter and symbol in accordance with a predetermined distance. The predetermined distance may be variably determined so that the letter and the symbol are in one font, but is not limited thereto. For example, the predetermined distance may be variably determined depending on an application or a program that provides letter entry mode or the type, characteristic, etc. of an input device that provides letter entry mode.

In accordance with the multi-language input method and the multi-language input apparatus using the same according to the present invention, a user can conveniently enter multi-language letters through one touch & gesture input.

Furthermore, the embodiments disclosed in this specification and drawings propose only specific examples in order to easily describe the contents of the present invention and help understanding, and the embodiments are not intended to restrict the scope of the present invention. Accordingly, it should be understood that all modifications or variations derived based on the technical spirit of the present invention in addition to the disclosed embodiments should be construed as being included in the present invention. It will be understood by those skilled in the art that various changes in form and details may be made therein without departing from the spirit and scope of the invention as defined by the appended claims and their equivalents.

What is claimed is:

1. A multi-language input method, comprising:
   sensing a touch input for a letter entry;
   identifying a letter corresponding to the touch input;
   sensing a touch gesture consecutive to the touch input;
   determining a direction in which the touch gesture is moved;
   identifying a symbol corresponding to the touch gesture and the determined direction from a memory;
   displaying the letter without the symbol based on the symbol not being stored in the memory;
   determining that the symbol corresponding to the touch gesture and the determined direction is combined on top of the letter corresponding to the touch input based on the symbol being stored in the memory; and
   displaying the letter corresponding to the touch input with the symbol corresponding to the touch gesture and the determined direction, based on the determination that the symbol is combined on top of the letter,
   wherein the symbol is displayed on the top of the letter.

2. The multi-language input method of claim 1, wherein the sensing the touch gesture comprises identifying a trace of the touch gesture.

3. The multi-language input method of claim 2, wherein the displaying the letter with the symbol comprises displaying a symbol having a trace identical with the identified trace of the touch gesture.

4. The multi-language input method of claim 2, wherein the displaying the letter with the symbol comprises displaying the symbol in a specific direction based on the letter.

5. The multi-language input method of claim 1, wherein the displaying the letter with the symbol comprises displaying the letter with the symbol within a predetermined distance.

6. A multi-language input apparatus, comprising:
   an input device that senses a user's input;
   a display device that displays information; and
   a controller that:
   controls the input device to sense a touch input for a letter entry;
   identifies a letter corresponding to the touch input;
   controls the input device to sense a touch gesture consecutive to the touch input,
   determines a direction in which the touch gesture is moved;
   identifies a symbol corresponding to the touch gesture and the determined direction from a memory;
   controls the display device to display the letter without the symbol based on the symbol not being stored in the memory;
   determines that the symbol corresponding to the touch gesture and the determined direction is combined on top of the letter corresponding to the touch input based on the symbol being stored in the memory; and
   controls the display device to display the letter corresponding to the touch input with the symbol corresponding to the touch gesture and the determined direction, based on the determination that the symbol is combined on top of the letter,
   wherein the symbol is displayed on the top of the letter.

7. The multi-language input apparatus of claim 6, wherein the controller identifies a trace of the touch gesture.

8. The multi-language input apparatus of claim 7, wherein the controller control the display to display a symbol having a trace identical with the identified trace of the touch gesture.

9. The multi-language input apparatus of claim 7, wherein the controller control the display to display the symbol in a specific direction based on the letter.

10. The multi-language input apparatus of claim 6, wherein the controller control the display to display the letter with the symbol within a predetermined distance.

\* \* \* \* \*